United States Patent
Inoue

(10) Patent No.: US 9,254,847 B2
(45) Date of Patent: Feb. 9, 2016

(54) SPEED RATIO CONTROL DEVICE AND SPEED RATIO CONTROL METHOD

(71) Applicant: NISSAN MOTOR CO., LTD., Yokohama-shi, Kanagawa (JP)

(72) Inventor: Jun Inoue, Sagamihara (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 14/389,826

(22) PCT Filed: Mar. 5, 2013

(86) PCT No.: PCT/JP2013/055908
§ 371 (c)(1),
(2) Date: Oct. 1, 2014

(87) PCT Pub. No.: WO2013/150848
PCT Pub. Date: Oct. 10, 2013

(65) Prior Publication Data
US 2015/0073671 A1 Mar. 12, 2015

(30) Foreign Application Priority Data

Apr. 2, 2012 (JP) ................................. 2012-084020

(51) Int. Cl.
| | |
|---|---|
| *F16H 61/662* | (2006.01) |
| *B60W 30/18* | (2012.01) |
| *F16H 59/50* | (2006.01) |
| *B60W 10/06* | (2006.01) |
| *B60W 10/10* | (2012.01) |
| *F16H 59/14* | (2006.01) |
| *F16H 61/02* | (2006.01) |
| *F16H 59/66* | (2006.01) |
| *F16H 59/52* | (2006.01) |

(52) U.S. Cl.
CPC ......... *B60W 30/18009* (2013.01); *B60W 10/06* (2013.01); *B60W 10/10* (2013.01); *F16H 59/50* (2013.01); *B60W 2530/22* (2013.01); *B60W 2550/142* (2013.01); *B60W 2720/106* (2013.01); *F16H 59/14* (2013.01); *F16H 61/0213* (2013.01); *F16H 2059/525* (2013.01); *F16H 2059/663* (2013.01); *F16H 2061/0234* (2013.01)

(58) Field of Classification Search
None
See application file for complete search history.

(56) References Cited

U.S. PATENT DOCUMENTS

| | | | | |
|---|---|---|---|---|
| 4,793,217 | A * | 12/1988 | Morisawa et al. .............. | 477/41 |
| 5,047,937 | A * | 9/1991 | Vahabzadeh et al. .......... | 701/54 |
| 5,382,205 | A * | 1/1995 | Togai et al. .................... | 477/43 |
| 5,749,804 | A * | 5/1998 | Toukura .......................... | 477/47 |
| 6,019,701 | A * | 2/2000 | Mori et al. ...................... | 477/46 |

(Continued)

FOREIGN PATENT DOCUMENTS

| | | |
|---|---|---|
| JP | 2005-076673 A | 3/2005 |
| JP | 2011-105202 A | 6/2011 |

*Primary Examiner* — Dirk Wright
(74) *Attorney, Agent, or Firm* — Foley & Lardner LLP

(57) ABSTRACT

A speed ratio control device for an automatic transmission of a vehicle calculate a minimum engine rotation speed based on a travel load, and sets a target speed ratio such that the engine rotation speed does not fall below the minimum engine rotation speed. If the travel load of the vehicle is equal to or greater than a predetermined value, a higher value is used for the minimum engine rotation speed compared to a case when the travel load of the vehicle is smaller than the predetermined value. Re-acceleration performance of the vehicle under a high travel load as in a case when the vehicle travels uphill while towing another vehicle is thereby improved.

8 Claims, 14 Drawing Sheets

(56) References Cited

U.S. PATENT DOCUMENTS

| | | | |
|---|---|---|---|
| 6,104,976 A * | 8/2000 | Nakamura | 701/95 |
| 6,148,257 A * | 11/2000 | Katakura et al. | 701/54 |
| 6,217,477 B1 * | 4/2001 | Nobumoto et al. | 477/43 |
| 6,345,221 B2 * | 2/2002 | Hattori et al. | 701/51 |
| 6,379,282 B1 * | 4/2002 | Aoki | 477/109 |
| 6,393,349 B1 * | 5/2002 | Yasuoka | 701/54 |
| 6,482,122 B2 * | 11/2002 | Ochiai et al. | 477/42 |
| 6,546,329 B2 * | 4/2003 | Bellinger | 701/115 |
| 6,726,594 B2 * | 4/2004 | Mizuno et al. | 477/37 |
| 6,866,610 B2 * | 3/2005 | Ito | 477/43 |
| 7,027,904 B2 * | 4/2006 | Ishizu et al. | 701/93 |
| 7,162,353 B2 * | 1/2007 | Minowa et al. | 701/96 |
| 7,552,712 B1 * | 6/2009 | Barngrover et al. | 123/352 |
| 7,729,838 B2 * | 6/2010 | Kaya | 701/54 |
| 7,801,654 B2 * | 9/2010 | Bai | 701/54 |
| 8,214,123 B2 * | 7/2012 | Inoue et al. | 701/93 |
| 8,478,495 B2 * | 7/2013 | Kato | 701/55 |
| 8,634,998 B2 * | 1/2014 | Kuras et al. | 701/67 |
| 8,676,457 B2 * | 3/2014 | Peterson et al. | 701/54 |
| 8,734,290 B2 * | 5/2014 | Fuller | 477/43 |
| 8,892,316 B2 * | 11/2014 | Eguchi et al. | 701/54 |
| 8,965,647 B2 * | 2/2015 | Aoki | 701/58 |

* cited by examiner

32 ACCELERATOR PEDAL DEPRESSION SENSOR  34 CRANK ANGLE SENSOR
33 THROTTLE OPENING SENSOR  35, 36 ROTATION SPEED SENSOR

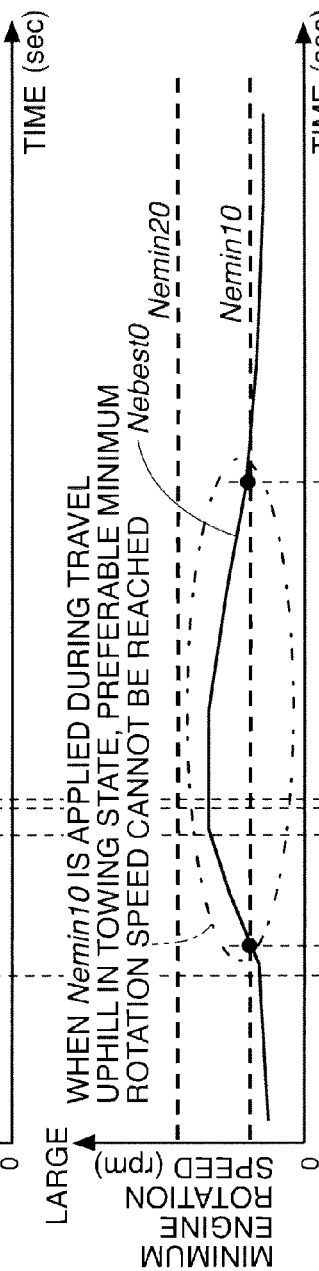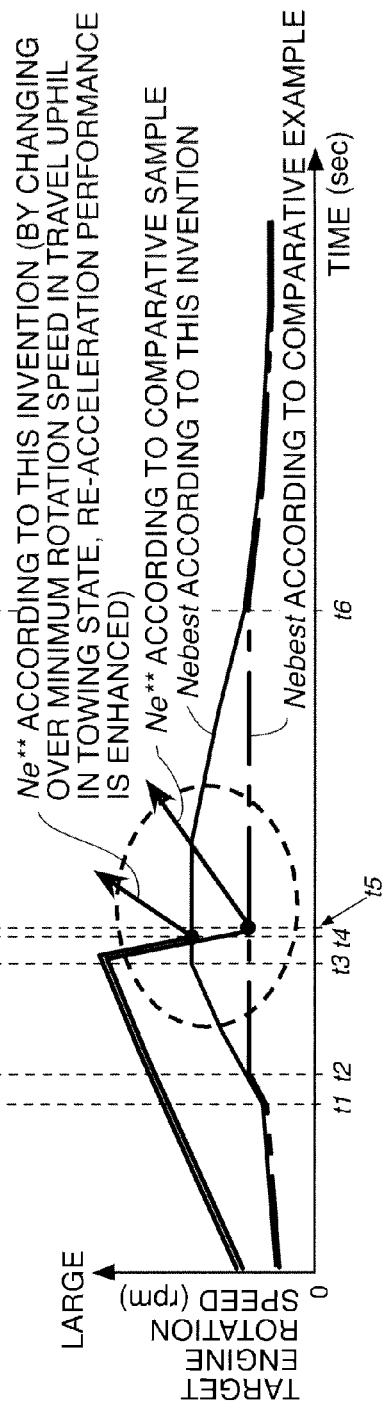

SPEED RATIO CONTROL DEVICE AND SPEED RATIO CONTROL METHOD

TECHNICAL FIELD

This invention relates to speed ratio control of a vehicle.

BACKGROUND ART

JP2005-076673A, published by the Japan Patent Office in 2005, proposes speed ratio control of a vehicle in which travel motive power is obtained from an internal combustion engine via an automatic transmission, for the purpose of improving re-acceleration performance during uphill travel.

In this prior art speed ratio control, an engine rotation speed lower limit value Nemin for generating a necessary engine output power with an engine torque when the accelerator is fully opened is determined. A speed ratio of the automatic transmission is then controlled so that the actual engine rotation speed does not fall below the engine rotation speed lower limit value Nemin. As a result, the speed ratio is restricted to a low-side speed ratio region, and the re-acceleration performance of the vehicle after passing a curve while traveling uphill is improved.

SUMMARY OF INVENTION

Considering suppression of a noise when the vehicle travels on a flat road, the engine rotation speed lower limit value to obtain a necessary vehicle drive power at a lowest mode speed ratio should not be set at a high-speed value. In other words, the engine rotation speed lower limit value is preferably set to conform to a small travel load.

The circumstances are however different when a vehicle is towing another vehicle. For example, a case where a vehicle towing another vehicle approaches a hill from a flat road and travels up the hill at approximately the same speed as on the flat road is considered. In this case, the travel load of the vehicle is evidently greater than in a case where the vehicle not towing another vehicle travels on a flat road. In such a case, it is necessary to set the engine rotation speed lower limit value to a higher value. On the other hand, if the engine rotation speed lower limit value is set to conform to a small travel load as described above, the necessary vehicle drive power may not be obtained when the engine rotation speed decreases to the vicinity of the engine rotation speed lower limit value. In other words, if an engine rotation speed lower limit value that is set to conform to a small travel load is applied, sufficient re-acceleration performance cannot be obtained when the vehicle travels under a large travel load.

It is therefore an object of this invention to realize speed ratio control of an automatic transmission so as to obtain sufficient re-acceleration performance even when the vehicle travels under a large travel load.

In order to achieve the above object, this invention provides a speed ratio control device for such a vehicle that comprises an internal combustion engine and an automatic transmission connected to the internal combustion engine. The speed ratio control device comprises a vehicle travel load detecting sensor that detects a travel load of the vehicle and a programmable controller. The controller is programmed to determine if the travel load is equal to or greater than a predetermined value, set an engine rotation speed lower limit value to a first value when the travel load is not equal to or greater than the predetermined value, and set the engine rotation speed lower limit value to a second value greater than the first value when the travel load is equal to or greater than the predetermined value. The controller is further programmed to set a target speed ratio of the automatic transmission such that a rotation speed of the internal combustion engine becomes equal to or greater than the engine rotation speed lower limit value set as described above and control a speed ratio of the automatic transmission to the target speed ratio.

The details as well as other features and advantages of this invention are set forth in the remainder of the specification and are shown in the accompanying drawings.

BRIEF DESCRIPTION OF DRAWINGS

FIGS. 3A-3C are timing charts that illustrate changes in a travel load of a vehicle, the minimum engine rotation speed, and a target engine rotation speed when a vehicle towing another vehicle is traveling uphill at a constant vehicle speed;

DESCRIPTION OF EMBODIMENTS

Figure 1:
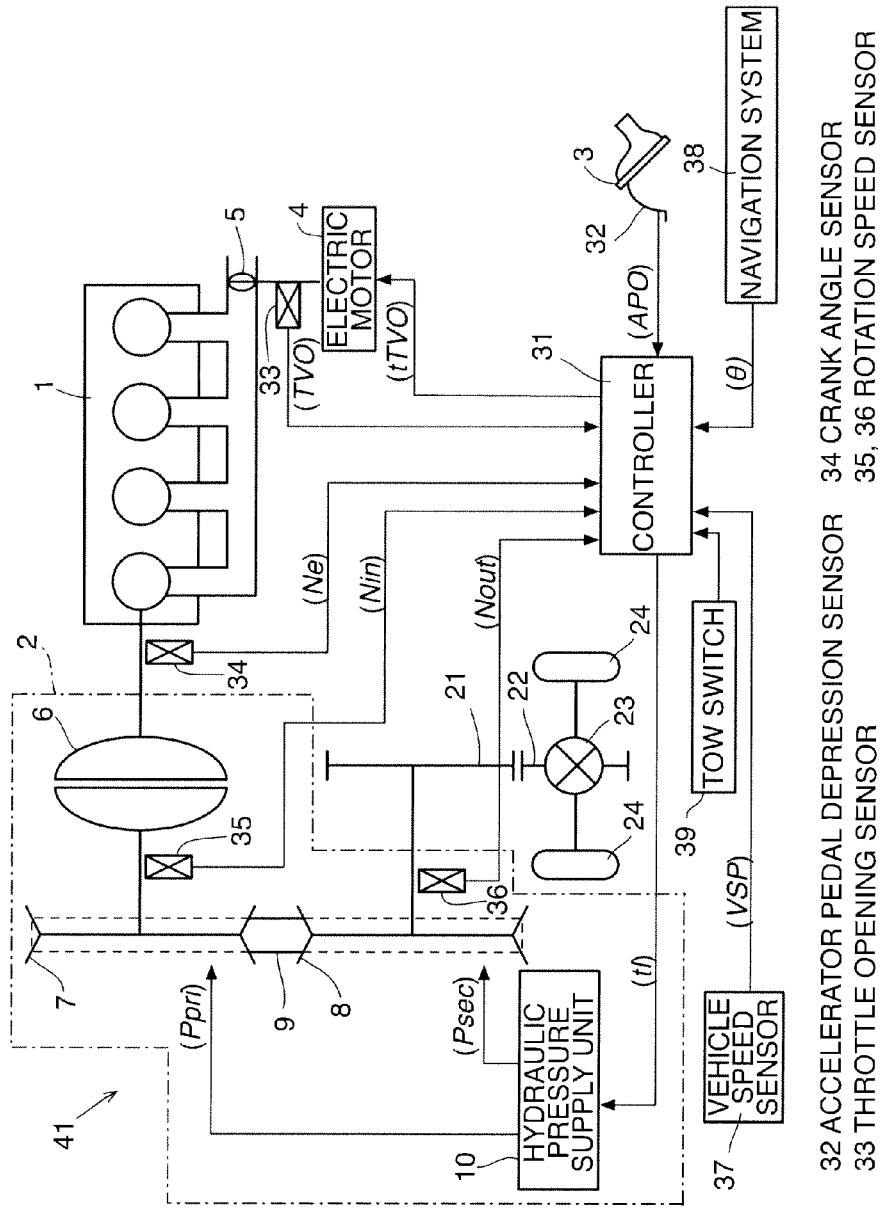
FIG. 1 is a schematic diagram of a speed ratio control device according to a first embodiment of this invention.

Referring to FIG. 1 of the drawings, a speed ratio control device according to a first embodiment of this invention is utilized in a vehicle 41. The vehicle 41 comprises an internal combustion engine 1 as a travel motive power source. A V-belt continuously variable transmission 2 is connected to the internal combustion engine 1. The internal combustion engine 1 is constituted by, for example, a gasoline engine.

The vehicle comprises an accelerator pedal 3 operated by a driver. The internal combustion engine 1 comprises an electronic throttle 5 driven by an electric motor 4. The accelerator pedal 3 and the internal combustion engine 1 are not mechanically connected. An opening of the throttle 5 is controlled to a target throttle opening tTVO by a controller 31 that inputs a target throttle opening command signal corresponding to a depression amount of the accelerator pedal 3 into the electric motor 4.

The continuously variable transmission 2 comprises a torque converter 6, a primary pulley 7, a secondary pulley 8, and a V-belt 9 that is looped around the primary pulley 7 and the secondary pulley 8. Rotation of the internal combustion engine 1 is input into the primary pulley 7 via the torque converter 6. Output rotation of the continuously variable transmission 2 is transmitted from the secondary pulley 8 to wheels 24 via final drive gears 21, 22 and a differential 23.

The primary pulley 7 and the secondary pulley 8 each comprise a pair of sheaves that forms a V-groove. One of the pair of sheaves is a movable sheave and the other is a fixed sheave. A width of the V-groove is narrowed when the movable sheave is driven in a direction approaching the fixed sheave. Conversely, the width of the V-groove is widened when the movable sheave is driven in a direction away from the fixed sheave. A wrapping radius of the V-belt 9 on the primary pulley 7 and a wrapping radius of the secondary pulley 8 change respectively in accordance with a change in the width of the V-groove. As a result, a speed ratio of the continuously variable transmission 2 changes. The movable sheave of the primary pulley 7 is driven by a primary pulley pressure Ppri supplied by a hydraulic pressure supply unit 10. The movable sheave of the secondary pulley 8 is driven by a secondary pulley pressure Psec supplied by the hydraulic pressure supply unit 10. The controller 31 controls the speed ratio of the continuously variable transmission 2 to a target speed ratio tI by supplying the primary pulley pressure Ppri and the secondary pulley pressure Psec.

The controller 31, which controls the throttle opening of the throttle 5, the primary pulley pressure Ppri supplied to the primary pulley 7, and the secondary pulley pressure Psec supplied to the secondary pulley 8, is constituted by a microcomputer comprising a central processing unit (CPU), a read-only memory (ROM), a random access memory (RAM), and an input/output interface (I/O interface). The controller may also be constituted by a plurality of microcomputers.

Detection data from an accelerator pedal depression sensor 32 that detects an accelerator opening APO from a depression amount of the accelerator pedal 3, a throttle opening sensor 33 that detects a throttle opening TVO of the electronic throttle 5, a crank angle sensor 34 that detects a rotation speed Ne of the internal combustion engine 1, a rotation speed sensor 35 that detects a transmission input rotation speed Nin which is the rotation speed of the primary pulley 7, a rotation speed sensor 36 that detects a transmission output rotation speed Nout which is the rotation speed of the secondary pulley 8, and a vehicle speed sensor 37 that detects a vehicle speed VSP, are input into the controller 31 as signals.

The controller 31 calculates the target throttle opening tTVO of the electronic throttle 5 and a target speed ratio tI of the continuously variable transmission 2 on the basis of the input signals. The controller 31 controls the throttle opening of the electronic throttle 5 to the target throttle opening tTVO by outputting a target throttle opening command signal corresponding to the target throttle opening tTVO calculated above to the electric motor 4. The controller 31 also controls the speed ratio of the continuously variable transmission 2 by calculating the primary pulley pressure Ppri and the secondary pulley pressure Psec which realize the target speed ratio tI calculated above and outputting a hydraulic pressure command signal corresponding to the calculation result to the hydraulic pressure supply unit 10.

Figure 13:
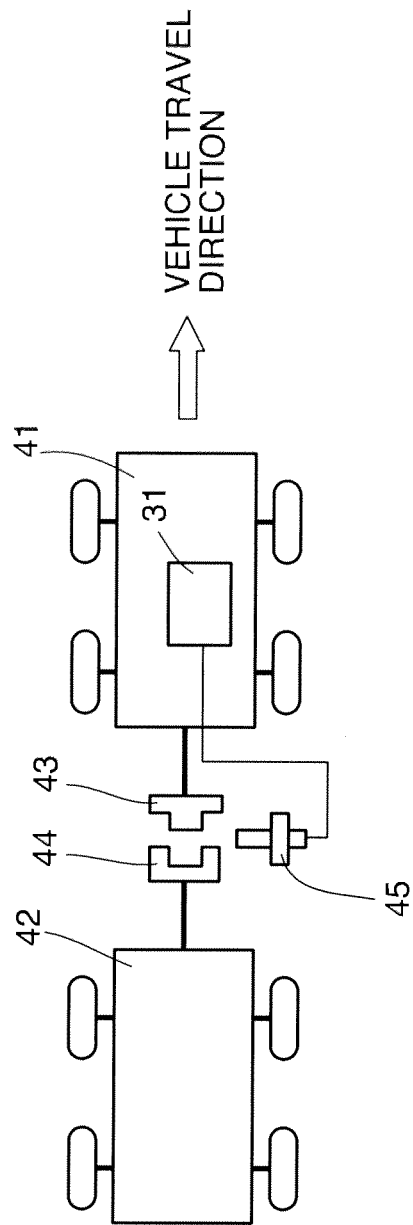
FIG. 13 is a schematic plan view of a towing vehicle and a vehicle to be towed according to a fourth embodiment of this invention.

When the vehicle 41 climbs a hill in a state where it is towing another vehicle 42 (hereinafter abbreviated as a "towing state") as shown in FIG. 13, the travel load becomes evidently large, exceeding a travel load range when the vehicle 41 is not towing another vehicle.

Figure 2:
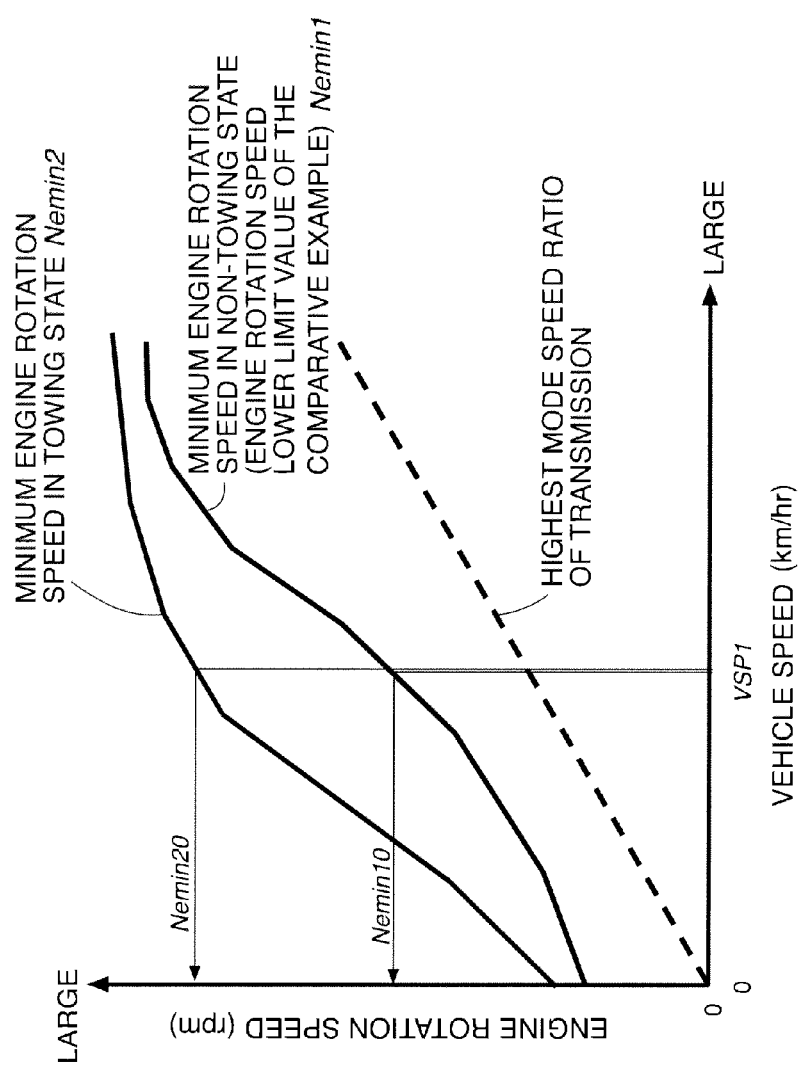
FIG. 2 is a diagram explaining a relationship between a vehicle speed and a minimum engine rotation speed.

FIG. 2 illustrates the characteristics of a minimum engine rotation speed for obtaining a necessary vehicle drive power when the vehicle 41 is driven via the continuously variable transmission 2 at a lowest mode speed ratio. Herein, a change in an engine rotation speed lower limit value Nemin1 according to a comparative example and a change in an engine rotation speed lower limit value Nemin2 in the towing state according to this invention are illustrated together with the vehicle speed VSP as a parameter. The engine rotation speed lower limit values Nemin1 and Nemin2 are the values when the accelerator is fully depressed. The change in an engine rotation speed lower limit value Nemin1 according to the comparative example corresponds to a minimum engine rotation speed in a non-towing state of the vehicle. According to this diagram, when the vehicle speed VSP is at a constant vehicle speed VSP1, a minimum engine rotation speed in the non-towing state of the vehicle is Nemin10 and the minimum engine rotation speed in the towing state of the vehicle is Nemin20.

The engine rotation speed lower limit value Nemin1 according to the comparative example is determined considering the balance between a drive power requirement and a requirement for suppressing noise and vibration. In other words, if the engine rotation speed lower limit valve Nemin1 when traveling on a flat road is increased, the vehicle drive power generated when driving the vehicle 41 via the continuously variable transmission 2 at the lowest mode speed ratio increases, and thus the vehicle travels more easily. At the same time, the noise generated by the internal combustion engine 1 increases and the drive feeling becomes worse. Thus, the engine rotation speed lower limit value Nemin1 is set to a rotation speed that is as high as possible within in a range in which the drive feeling does not worsen due to engine noise when traveling on a flat road.

FIGS. 3A-3C illustrate examples of changes in the travel load of the vehicle and changes in the rotation speed of the internal combustion engine when the vehicle in the towing state approaches a hill and travels uphill from a state in which it is traveling on a flat road. Specifically, in FIGS. 3A-3C, the vehicle traveling on a flat road starts to climb a hill at a time t1 and the driver depresses the accelerator pedal to try to maintain a vehicle speed constant. At a time t3, the driver slightly releases the accelerator pedal, and then depresses the accelerator pedal again to re-accelerate the vehicle. The vehicle speed VSP during this period is substantially maintained at the constant value VSP1 shown in FIG. 2. FIG. 3B illustrates together the engine rotation speed lower limit value Nemin10 in the non-towing state and the engine rotation speed lower limit value Nemin20 in the towing state at the vehicle speed VSP1. Referring to FIG. 3A, the travel load of the vehicle is highest during the short period after the vehicle starts to climb the hill from the flat road at the time t1. The travel load decreases when a vehicle speed equivalent to that when traveling on a flat road is achieved after the vehicle starts to climb the hill.

Referring to FIG. 3B, a minimum engine rotation speed basic value Nebest0 indicates a minimum engine rotation speed for obtaining a necessary vehicle drive power relative to a change in the travel load of the vehicle. The minimum engine rotation speed basic value Nebest0 increases corresponding to an increase in the travel load that occurs when the vehicle is traveling uphill in the towing state. If the travel load decreases, the minimum engine rotation speed basic value Nebest0 also decreases. When traveling on a flat road in the non-towing state, the minimum engine rotation speed basic value Nebest0 does not exceed the engine rotation speed lower limit value Nemin10. However, when the vehicle is traveling uphill in a towing-state, the minimum engine rotation speed basic value Nebest0 exceeds the engine rotation speed lower limit value Nemin10 in the interval from time t2 to time t6.

Thus, the engine rotation speed lower limit value Nemin10 that is set to conform to travel on a flat road is not suited to travel uphill in the towing state. The comparative example in FIG. 3C utilizes the engine rotation speed lower limit value Nemin10 for the minimum engine rotation speed Nebest and illustrates a case in which the vehicle is traveling uphill in the towing state. According to this comparative example, if the driver slightly releases the accelerator pedal at the time t3, a target engine rotation speed Ne** decreases to the engine rotation speed lower limit value Nemin10 at a time t5. Herein, the driver depresses the accelerator pedal again, but it takes time for the engine rotation speed to recover from this drop that means the re-acceleration performance of the vehicle is poor.

As shown in FIG. 2, the speed ratio control device according to the first embodiment of this invention introduces an engine rotation speed lower limit value Nemin2 that is higher than the engine rotation speed lower limit value Nemin1 of the comparative example in order to avoid the above-described delay in the increase of the target engine rotation speed Ne** when the vehicle is traveling in the towing state. In the following explanation, the engine rotation speed lower limit value Nemin2 will be referred to as the "minimum engine rotation speed in the towing state". Meanwhile, the engine rotation speed lower limit value Nemin1 will be referred to as the "minimum engine rotation speed in the non-towing state". As shown in FIG. 2, the engine rotation speed lower limit value Nemin2 in the towing state is higher than the engine rotation speed lower limit value Nemin1 in the non-towing state over all vehicle speed regions. The speed ratio control device determines if the vehicle is in the towing state, and if it determines that the vehicle is in the towing state, it controls the speed ratio of the continuously variable transmission 2 on the basis of the engine rotation speed lower limit value Nemin2 in the towing state instead of the engine rotation speed lower limit value Nemin1 in the non-towing state.

Referring to FIG. 3B, a change in the minimum engine rotation speed Nebest when the vehicle in the towing state starts to climb a hill from a state in which it is traveling on a flat road and travels up the hill at a substantially constant vehicle speed VSP will now be described.

If the engine rotation speed lower limit value Nemin2 in the towing state is applied, the minimum engine rotation speed when the vehicle in the towing state starts to climb the hill from the flat road while maintaining the vehicle speed at the substantially constant vehicle speed VSP1 is set equal to Nemin20 as can be seen in FIG. 2. Referring to FIG. 3B, the engine rotation speed lower limit value Nemin20 in the towing state is positioned above the minimum engine rotation speed basic value Nebest0. As described above, the minimum engine rotation speed basic value Nebest0 is the minimum engine rotation speed for obtaining the necessary vehicle drive power relative to the change in the travel load of the vehicle. Therefore, even if the engine rotation speed falls below the engine rotation speed lower limit value Nemin20 in the towing state, as long as it is maintained at or above the minimum engine rotation speed basic value Nebest0, the vehicle can be quickly re-accelerated. According to the first embodiment of this invention, the minimum engine rotation speed basic value Nebest0 is used as the minimum engine rotation speed Nebest as shown by the solid line in FIG. 3C.

As described above, if the driver releases the accelerator pedal 3 once at the time t3 and then immediately depresses the accelerator pedal 3 again to re-accelerate, the following occurs in the first embodiment of this invention. By releasing the accelerator pedal 3 once while traveling uphill, the target engine rotation speed Ne drops suddenly, but the decrease in the target engine rotation speed Ne stops at a time t4 when it reaches the minimum engine rotation speed Nebest illustrated by the solid line in FIG. 3B. In other words, the target engine rotation speed Ne does not decrease below the minimum engine rotation speed Nebest. If the driver depresses the accelerator pedal 3 again, the target engine rotation speed Ne rises back up from the minimum engine rotation speed Nebest.

In the interval from the time t2 to the time t6, the minimum engine rotation speed Nebest of the first embodiment of this invention is higher than the minimum engine rotation speed Nebest of the comparative example, and thus the drop in the target engine rotation speed Ne decreases accordingly. As a result, the delay in the rise of the target engine rotation speed Ne generated in the interval from the time t2 to the time t6 when the vehicle is traveling uphill in the towing state is suppressed, and the re-acceleration performance when the vehicle is traveling uphill in the towing state can be enhanced.

The engine rotation speed lower limit value Nemin2 in the towing state is higher than the engine rotation speed lower limit value Nemin1 in the non-towing state. Thus, if the engine rotation speed lower limit value Nemin2 in the towing state is applied, the noise generated by the internal combustion engine is large. However, since the driver is aware of the existence of the towing load when the vehicle is traveling uphill in the towing state, unlike when traveling on a flat road in the non-towing state, it is understood that a slight increase in the engine noise is permissible.

Figure 4:
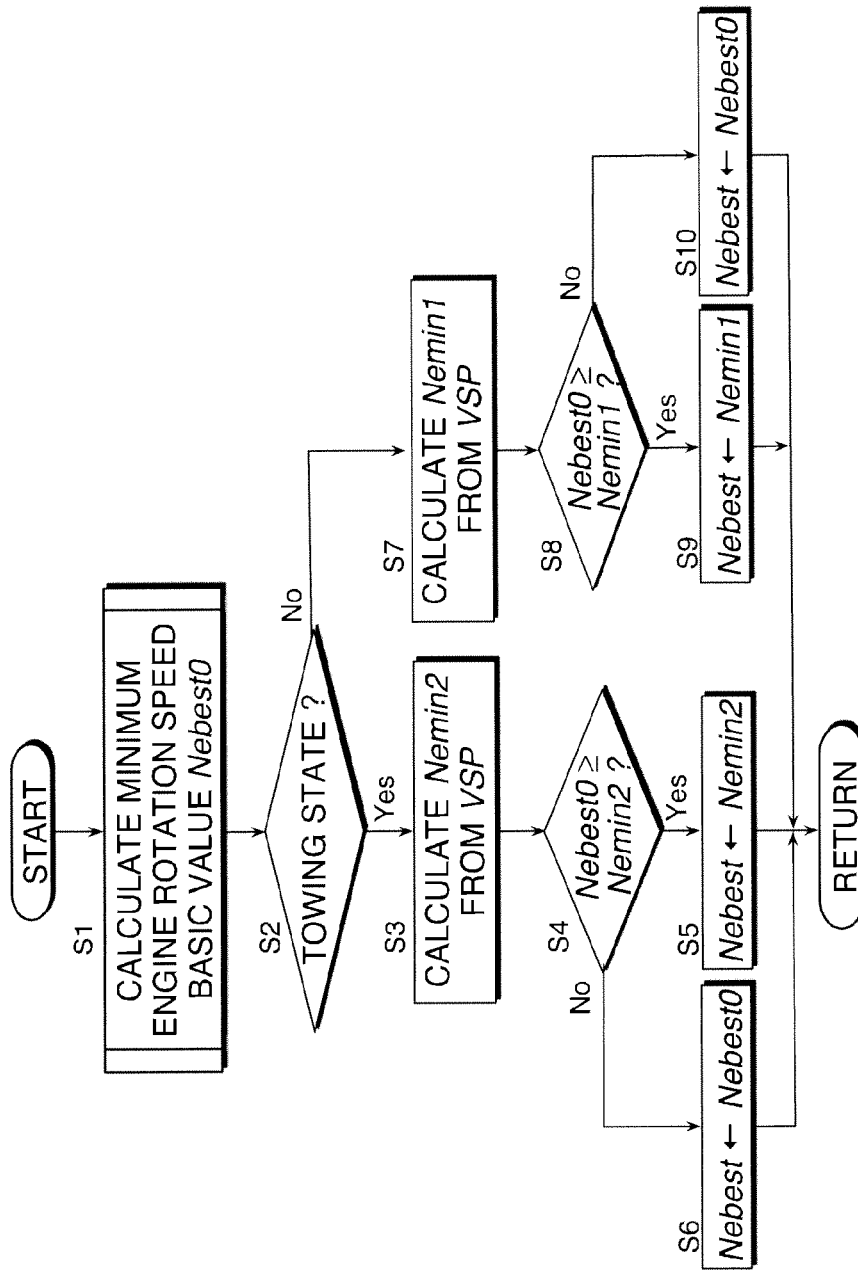
FIG. 4 is a flow chart explaining a minimum engine rotation speed Nebest calculation routine executed by a controller according to the first embodiment of this invention.

Referring to FIG. 4, a calculation routine of the minimum engine rotation speed Nebest executed by the controller 31 in order to carry out the above-described control will now be explained. The controller 31 executes this routine at fixed intervals, for example every ten milliseconds, while the vehicle is traveling.

In a step S1, the controller 31 calculates the minimum engine rotation speed basic value Nebest0.

Figure 5:
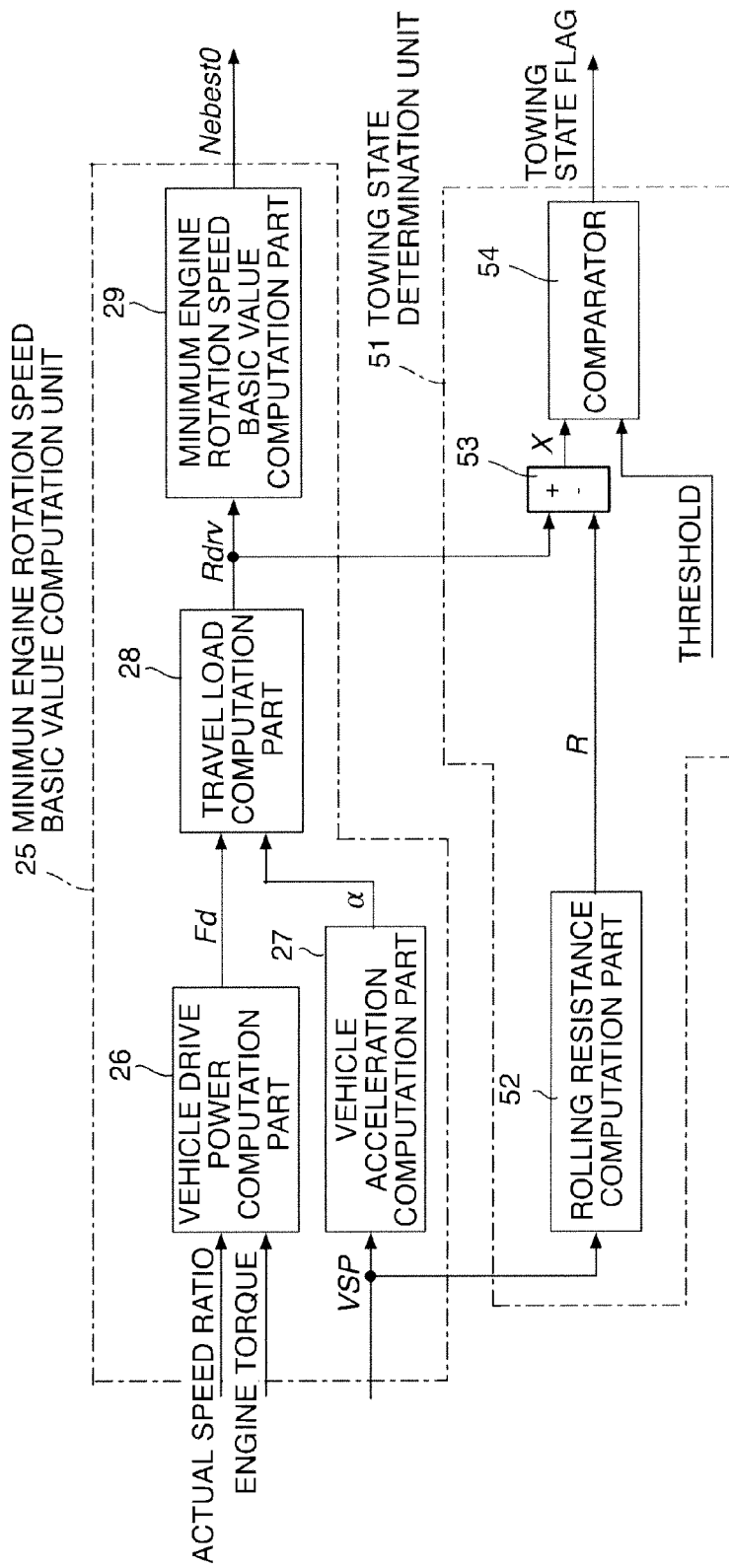
FIG. 5 is a block diagram explaining a minimum engine rotation speed basic value calculation function of the controller.

Referring to FIG. 5, the method for computing the minimum engine rotation speed basic value Nebest0 will be described.

The controller 31 comprises a minimum engine rotation speed basic value computation unit 25 constituted by a vehicle drive power computation part 26, a vehicle acceleration computation part 27, a travel load computation part 28, and a minimum engine rotation speed basic value computation part 29.

The vehicle drive power computation part 26 calculates a vehicle drive power Fd (Newton (N)) from the engine torque and an actual speed ratio of the continuously variable transmission 2. For example, the vehicle drive power Fd can be calculated by preparing a predetermined map in advance using the engine torque and the speed ratio as parameters and then searching on the map from the engine torque and the actual speed ratio. With regard to the engine torque, it can be calculated by preparing a predetermined map in advance using the engine load and the rotation speed as parameters and then searching on the map from the engine load and the rotation speed. The actual speed ratio rI is calculated using the following equation (1) from the transmission input rotation speed Nin detected by the rotation speed sensor 35 and the transmission output rotation speed Nout detected by the rotation speed sensor 36.

$$rI = Nin/Nout \quad (1)$$

The vehicle acceleration computation part 27 calculates a vehicle acceleration α based on the vehicle speed VSP detected by the vehicle speed sensor 37. The vehicle acceleration α is a derivative of the vehicle speed VSP, and thus an amount of change in the vehicle speed VSP at a predetermined time can be found and this value can be used as the vehicle acceleration α.

The travel load computation part 28 calculates a travel load (N) from the vehicle drive power Fd and the vehicle acceleration α based on the following equation (2) of motion.

$$F = M \cdot \alpha = Fd - R - X = Fd - (R + X) \quad (2)$$

wherein
M=vehicle weight;
R=rolling resistance (including air resistance) (N); and
X=resistance that increases when traveling uphill or in the towing state (N).
In the equation (2), $$R + X = Rdrv \quad (3)$$

wherein, Rdrv is defined as the "travel load".

As can be understood from the equation (3), the travel load comprises not only a resistance that increases due to the towing state but also a resistance that increases due to traveling uphill. In the comparative example, the rolling resistance R is considered, but the resistance X that increases when traveling uphill or in the towing state is not considered. The travel load Rdrv is obtained by the following equation (4).

$$Rdrv = Fd - M \cdot \alpha \quad (4)$$

The equation (4) is obtained by converting the equation (2). The vehicle drive power Fd and the vehicle acceleration α are calculated by the above-described methods. If these are substituted together with the vehicle weight M into the equation (4), the travel load Rdrv can be calculated.

Figure 6:
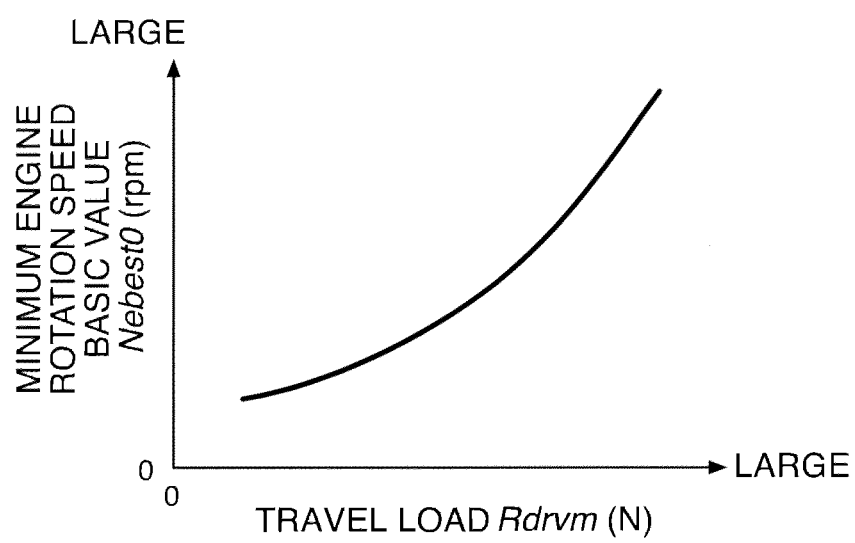
FIG. 6 is a diagram illustrating the characteristics of a minimum engine rotation speed basic value map stored in the controller.

The minimum engine rotation speed basic value computation part 29 calculates the minimum engine rotation speed basic value Nebest0 from the travel load Rdrv referring to a characteristics map shown in FIG. 6 that is stored in advance in the ROM of the controller 31. The minimum engine rotation speed basic value Nebest0 indicates the minimum engine rotation speed at which the necessary vehicle drive power when driving the vehicle 41 via the continuously variable transmission 2 at the lowest mode speed ratio is obtained. The minimum engine rotation speed basic value Nebest0 is determined considering whether the vehicle is traveling on a flat road or uphill and whether the vehicle is in the towing state or the non-towing state. In other words, these are used as parameters in the map of the minimum engine rotation speed basic value Nebest0 of FIG. 6 for the travel load Rdrv. As shown in FIG. 6, as the travel load Rdrv increases, a higher minimum engine rotation speed basic value Nebest0 is required.

Referring again to FIG. 4, after the controller 31 calculates the minimum engine rotation speed basic value Nebest0 in the step S1, it determines whether the vehicle 41 is in the towing state from a towing flag in a step S2.

Referring to FIG. 5 again, the controller 31 sets the towing flag used for the above-mentioned determination in a towing state determination unit 51 constituted by a rolling resistance computation part 52, a subtractor 53, and a comparator 54. Each block in FIG. 5 illustrates each function of the controller 31 as a virtual unit, and does not represent a physical existence.

Figure 7:
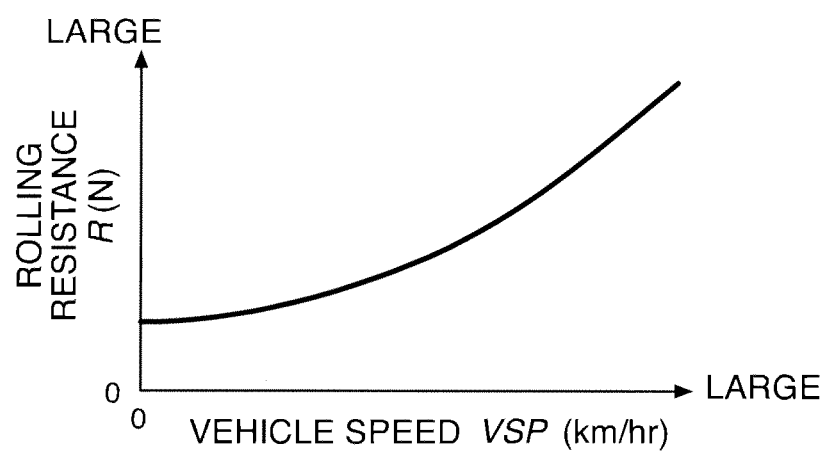
FIG. 7 is a diagram illustrating the characteristics of a rolling resistance map stored in the controller.

The rolling resistance computation part 52 calculates the rolling resistance R (N) from the vehicle speed VSP referring to a characteristics map shown in FIG. 7 that is stored in advance in the ROM of the controller 31. The rolling resistance R also includes air resistance of the vehicle. The subtractor 53 calculates an increased resistance X (N) due to traveling uphill or the towing state by subtracting the rolling resistance R from the travel load Rdrv based on the equation (3).

The comparator 54 compares the increased resistance X (N) due to traveling uphill or the towing state with a threshold (N). If the resistance X that increases when the vehicle is traveling uphill or is in the towing state is equal to or greater than the threshold, it is determined that the vehicle is in the towing state, and a towing state flag is set to unity. The towing state flag is initially set to zero when the engine is started or the vehicle starts driving. Herein, if it is determined that the vehicle is in the towing state, in addition to a case in which the vehicle is traveling uphill in the towing state, a case in which the vehicle is traveling on a flat road in the towing state and a case in which the vehicle is traveling uphill in the non-towing state are also comprised therein. On the other hand, if the increased resistance X due to traveling uphill or the towing state is less than the threshold, it is determined that the vehicle is in the non-towing state, and the towing state flag is reset to zero.

The threshold is a value for distinguishing whether the Nemin2 in the towing state or the Nemin1 in the non-towing state is used as the engine rotation speed lower limit value. The threshold is appropriately set in advance.

Referring again to FIG. 4 again, in the step S2, the controller 31 determines the towing state flag output from the towing state determination unit 51. If the towing state flag is unity, the controller 31 performs the process of a step S3. If the towing state flag is zero, the controller 31 performs the process of a step S7.

Figure 8:
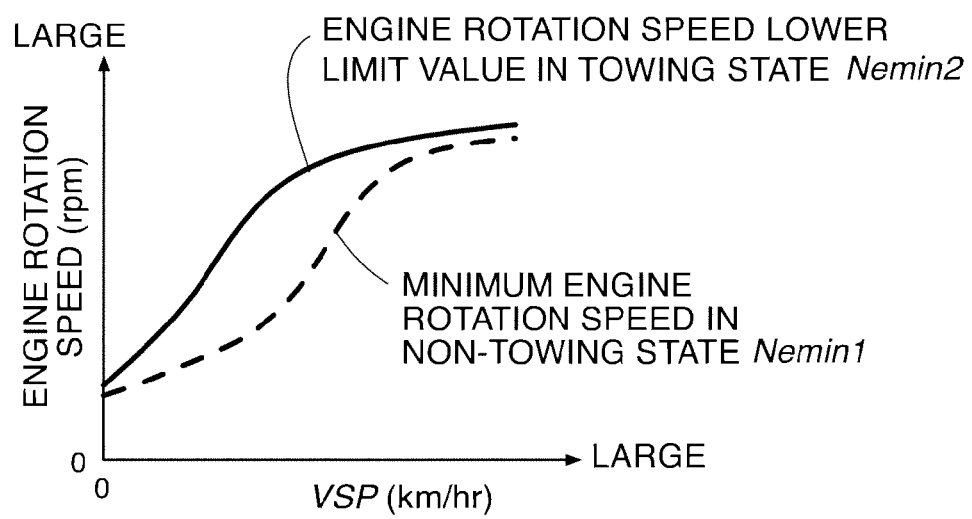
FIG. 8 is a diagram illustrating the characteristics of a minimum engine rotation speed map stored in the controller.

In the step S3, the controller 31 calculates the engine rotation speed lower limit value Nemin2 in the towing state from the vehicle speed VSP detected by the vehicle speed sensor 37 referring to a characteristics map shown by a solid line in FIG. 8 that is stored in advance in the ROM. As shown by the solid line in FIG. 8, the engine rotation speed lower limit value Nemin2 in the towing state increases as the vehicle speed VSP increases. The map in FIG. 8 is set in advance through experiments.

In a next step S4, the controller 31 compares the minimum engine rotation speed basic value Nebest0 and the engine rotation speed lower limit value Nemin2 in the towing state. If the minimum engine rotation speed basic value Nebest0 is equal to or greater than the engine rotation speed lower limit value Nemin2 in the towing state, the controller 31 sets the engine rotation speed lower limit value Nemin2 in the towing state as the minimum engine rotation speed Nebest in a step S5. Herein, the engine rotation speed lower limit value Nemin2 in the towing state is set as the minimum engine rotation speed Nebest in order to take noise suppression into account.

On the other hand, in the step S4, if the minimum engine rotation speed basic value Nebest0 is less than the engine rotation speed lower limit value Nemin2 in the towing state, the controller 31 sets the minimum engine rotation speed basic value Nebest0 as the minimum engine rotation speed Nebest in a step S6. As long as the target engine rotation speed is equal to or greater than the minimum engine rotation speed basic value Nebest0, no problems with regard to re-acceleration will occur even if the target engine rotation speed falls below the engine rotation speed lower limit value Nemin2 in the towing state. It is preferable to reduce the target engine rotation speed in order to suppress noise as long as it does not hinder re-acceleration. Thus, the controller 31 sets the minimum engine rotation speed basic value Nebest0 as the minimum engine rotation speed Nebest in the step S6.

Meanwhile, in a step S7, the controller 31 calculates the engine rotation speed lower limit value Nemin1 in the non-towing state from the vehicle speed VSP detected by the vehicle speed sensor 37 referring to a characteristics map shown by a dashed line in FIG. 8 that is stored in advance in the ROM. As shown by the dashed line in FIG. 8, the engine rotation speed lower limit value Nemin1 in the non-towing state also increases as the vehicle speed VSP increases. The engine rotation speed lower limit value Nemin2 in the towing state is higher than the engine rotation speed lower limit value Nemin1 in the non-towing state over all vehicle speed regions.

In a step S8, the controller 31 compares the minimum engine rotation speed basic value Nebest0 and the engine rotation speed lower limit value Nemin1 in the non-towing state. If the minimum engine rotation speed basic value Nebest0 is equal to or greater than the engine rotation speed lower limit value Nemin1 in the non-towing state, the controller 31 sets the engine rotation speed lower limit value Nemin1 in the non-towing state as the minimum engine rotation speed Nebest in a step S9. If the minimum engine rotation speed basic value Nebest0 is less than the engine rotation speed lower limit value Nemin1 in the non-towing state, the controller 31 sets the minimum engine rotation speed basic value Nebest0 as the minimum engine rotation speed Nebest in a step S10.

The minimum engine rotation speed Nebest set as described above is stored in the RAM.

Figure 9:
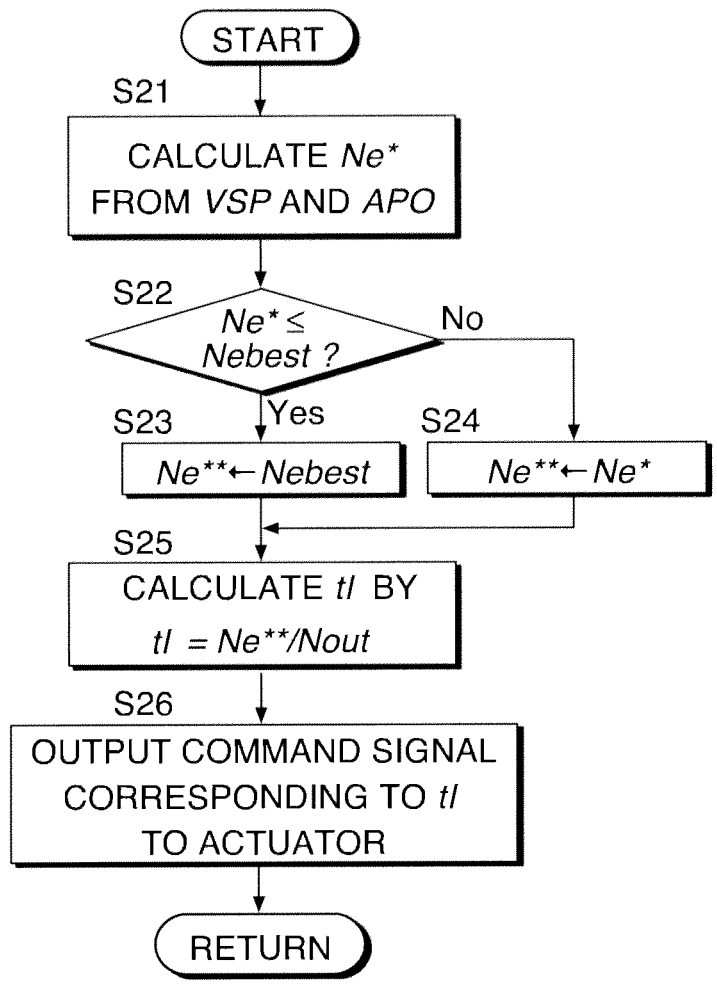
FIG. 9 is a flow chart explaining a speed ratio control routine executed by the controller.

Referring next to FIG. 9, a speed ratio control routine of the continuously variable transmission 2 executed by the controller 31 using the minimum engine rotation speed Nebest will be described. The controller 31 executes this routine at fixed intervals, for example every ten milliseconds, while the vehicle is traveling.

Figure 10:
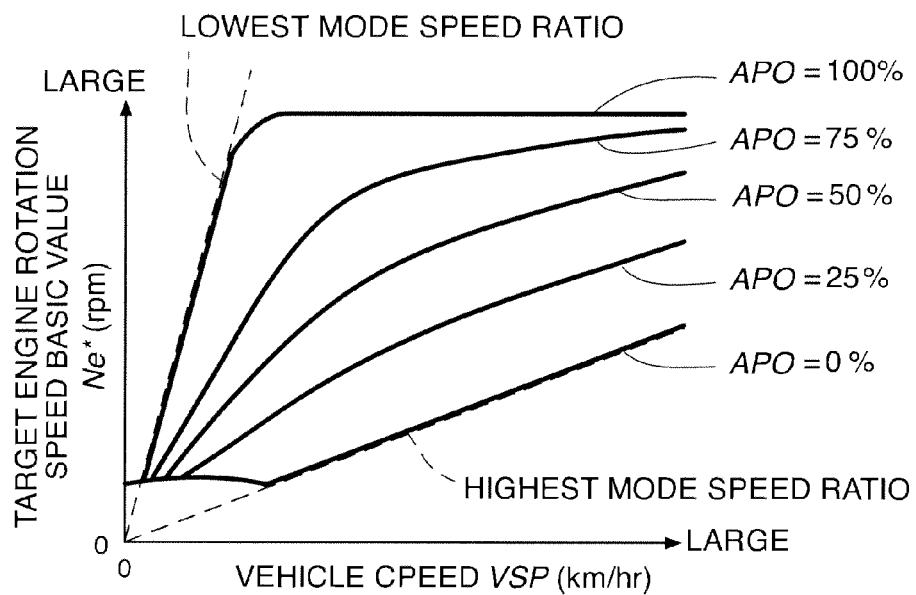
FIG. 10 is a diagram illustrating the characteristics of a target engine rotation speed basic value map stored in the controller.

In a step S21, the controller 31 calculates the target engine rotation speed basic value Ne* from the vehicle speed VSP and the accelerator opening APO referring to a characteristics map shown in FIG. 10.

In a step S22, the controller 31 compares the target engine rotation speed basic value Ne* and the minimum engine rotation speed Nebest. If the target engine rotation speed basic value Ne* is equal to or less than the minimum engine rotation speed Nebest, the controller 31 sets the minimum engine rotation speed Nebest as the target engine rotation speed Ne so as to restrict the target engine rotation speed Ne to the minimum engine rotation speed Nebest.

The minimum engine rotation speed Nebest is set as the target engine rotation speed Ne** for the following reasons. As described above, the minimum engine rotation speed Nebest is the minimum engine rotation speed that is set so that the necessary vehicle drive power when driving the vehicle 41 via the continuously variable transmission 2 at the lowest mode speed ratio is obtained. In the case that the target engine rotation speed basic value Ne* is equal to or less than the minimum engine rotation speed Nebest, if the target engine rotation speed basic value Ne* is set as the target engine rotation speed Ne**, the necessary vehicle drive power when driving the vehicle 41 via the continuously variable transmission 2 at the lowest mode speed ratio can no longer be obtained. Thus, setting the minimum engine rotation speed Nebest instead of the target engine rotation speed basic value Ne* as the target engine rotation speed Ne** prevents the vehicle drive power when driving the vehicle 41 via the continuously variable transmission 2 at the lowest mode speed ratio from becoming insufficient.

On the other hand, if the target engine rotation speed basic value Ne* is equal to or greater than the minimum engine rotation speed Nebest, the necessary vehicle drive power when driving the vehicle 41 via the continuously variable transmission 2 at the lowest mode speed ratio can be obtained even if the target engine rotation speed basic value Ne* is output as it is as the target engine rotation speed Ne. In other words, it is not necessary to restrict the target engine rotation speed Ne to the minimum engine rotation speed Nebest, and thus the target engine rotation speed basic value Ne* can be output as it is as the target engine rotation speed Ne**.

In a step S25, the controller 31 calculates the target speed ratio tI of the continuously variable transmission 2 by dividing the target engine rotation speed Ne** by the transmission output rotation speed Nout detected by the rotation speed sensor 36 according to the following equation (5).

$$tI = Ne^{**}/Nout \qquad (5)$$

In a step S26, the controller 31 outputs a command signal converted from the target speed ratio tI to the hydraulic pressure supply unit 10.

In this embodiment, the controller 31 executes the computation routine of the minimum engine rotation speed Nebest in FIG. 4 based on the travel load. In other words, the controller 31 determines whether the travel load of the vehicle is equal to or greater than the predetermined value in the step S2, and if the travel load is equal to or greater than the predetermined value, it sets the minimum engine rotation speed Nebest in the step S5 or S6. If the travel load of the vehicle is less than the predetermined value, the controller 31 sets the minimum engine rotation speed Nebest in the step S9 or S10. If the minimum engine rotation speed Nebest set in the step S9 or S10 is regarded as a second value and the minimum engine rotation speed Nebest set in the step S5 or S6 is regarded as a first value, the second value is always greater than the first value. The controller 31 uses the minimum engine rotation speed Nebest that has been set as described above to determine the target speed ratio tI of the continuously variable transmission 2 in the steps S21 to S25 and to control the speed ratio of the continuously variable transmission 2 to the target speed ratio tI in the step S26 by executing the speed ratio control routine of FIG. 9.

Therefore, when traveling in a state in which the travel load is increased such as traveling uphill in the towing state, the minimum engine rotation speed in a state in which the travel load is small such as the non-towing state is not applied, and thus a preferable re-acceleration performance can be maintained also when traveling in a state in which the travel load is increased.

In detail, the controller 31 sets the first value and the second value according to the travel load. In other words, the controller 31 calculates the minimum engine rotation speed basic value Nebest0 used in the steps S6 and S10 based on the travel load Rdrv calculated by the travel load computation part 28 shown in FIG. 5. Thus, the most suitable minimum engine rotation speed basic value Nebest0 can be calculated according to the change in the travel load Rdrv, and preferable effects can be achieved in that the reciprocal requirements of vehicle re-acceleration performance and engine noise suppression are simultaneously satisfied.

Further, the speed ratio control device according to the first embodiment of this invention comprises the accelerator opening APO detected by the accelerator pedal depression sensor 32 as the load of the internal combustion engine 1, the crank angle sensor 34 that detects the rotation speed Ne of the engine, and the vehicle speed sensor 37 that detects the vehicle speed VSP. The controller 31 calculates the engine torque from the accelerator opening APO and the engine rotation speed Ne by referring to a map in the vehicle drive power computation part 26 shown in FIG. 5. In the vehicle drive power computation part 26, the vehicle drive power Fd is also calculated from the engine torque and the actual speed ratio of the continuously variable transmission 2. On the other hand, in the vehicle acceleration computation part 27, the vehicle acceleration α is calculated from the vehicle speed VSP. In the travel load computation part 28, the travel load Rdrv is calculated from the drive power Fd and the vehicle acceleration α.

The accelerator pedal depression sensor 32, the crank angle sensor 34, and the vehicle speed sensor 37 are sensors that have been used in speed ratio control devices, and thus the travel load Rdrv can be found without adding any new sensors or the like. Further, by this kind of calculation method, resistance that increases due to towing another vehicle 42 and resistance that increases due to traveling uphill can be comprised in the travel load Rdrv.

Figure 11:
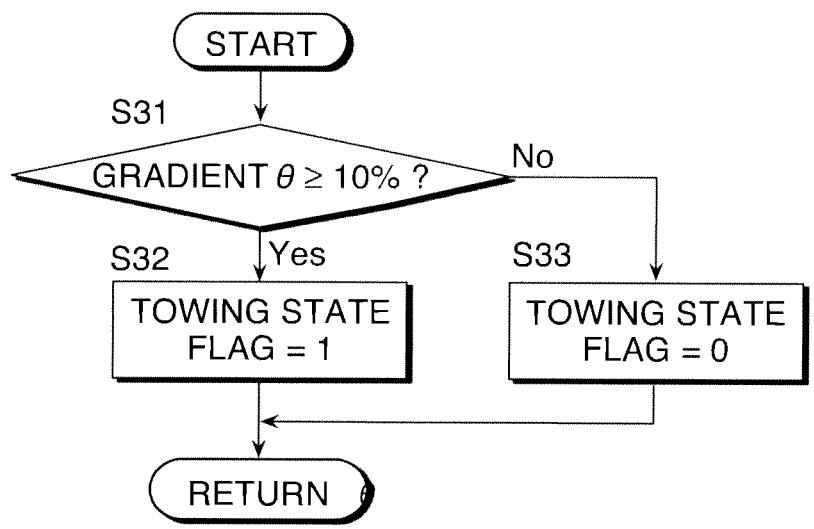
FIG. 11 is a flow chart explaining a towing state flag setting routine executed by a controller according to a second embodiment of this invention.

Referring to FIG. 11 next, a second embodiment of this invention will be described.

FIG. 11 illustrates a towing state flag setting routine executed by the controller 31 according to the second embodiment of this invention. In the first embodiment, the towing state flag was set in the towing state determination unit 51. However, in this embodiment, the controller 31 sets the towing state flag by executing the towing state flag setting routine. The controller 31 executes this towing state flag setting routine at fixed intervals, for example every ten milliseconds, while the vehicle is traveling.

In this embodiment, as shown in FIG. 1, a road surface gradient θ (%) on which the vehicle is traveling is input from a navigation system 38 equipped in the vehicle to the controller 31. In a step S31, the controller 31 compares the road surface gradient θ (%) to a threshold of 10(%). The road surface gradient θ is calculated as tan θ according to the following equation (6) from a height difference and a horizontal distance between two points on the road surface on which the vehicle is traveling.

$$\tan \theta = (\text{height difference between two points})/(\text{horizontal distance connecting two points}) \quad (6)$$

The road surface gradient θ can be calculated according to the following equation (7).

$$\theta = \arctan\{(\text{height difference between two points})/(\text{horizontal distance connecting two points})\} \quad (7)$$

The function of arctan used in the equation (7) is preferably incorporated into the navigation system 38 in advance. If the road surface gradient θ is equal to or greater than 10(%) in the step S31, the controller 31 determines that the vehicle is in the towing state and sets the towing state flag to unity in a step S32. The towing state flag is initially set to zero when the internal combustion engine 1 is started or the vehicle starts driving. If the road surface gradient θ is less than 10(%) in the step S31, the controller 31 determines that the vehicle is not in the towing state, and resets the towing state flag to zero in a step S33.

The controller 31 in the first embodiment, which determines whether the vehicle is in the towing state based on the travel load Rdrv, may determine that the vehicle is in the towing state not only when the vehicle is traveling uphill in the towing state but also when the vehicle is traveling on a flat road in the towing state or when the vehicle is traveling uphill in the non-towing state. According to this embodiment, since the towing state is determined based on the road surface gradient θ, the vehicle will not be determined to be in the towing state when traveling on a flat road in the towing state. Therefore, this embodiment corresponds to a simplified version of the first embodiment. The controller 31 according to this embodiment executes the computation routine of the minimum engine rotation speed Nebest of FIG. 4 using the towing state flag set by executing the towing state flag setting routine of FIG. 11.

According to this embodiment, the invention can be executed with a simple constitution.

Figure 12:
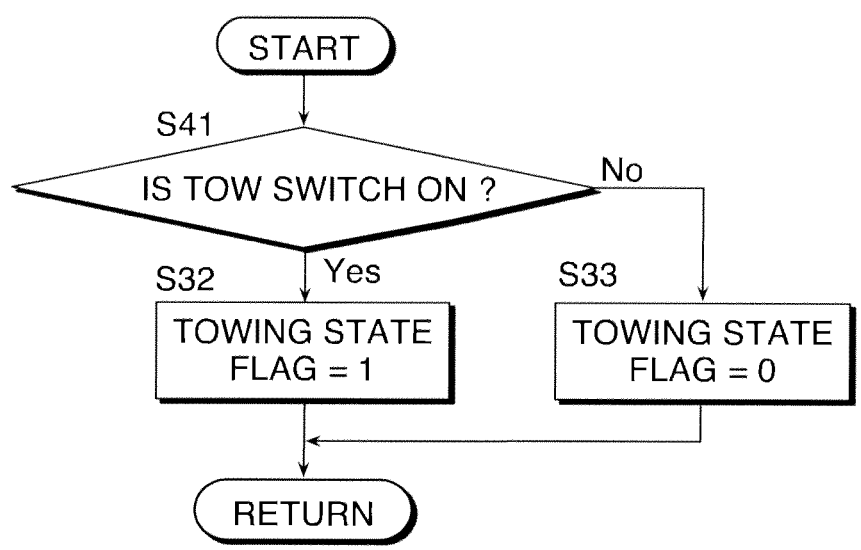
FIG. 12 is similar to FIG. 11 but illustrates a third embodiment of this invention.

Referring to FIG. 12 next, a third embodiment of this invention will be described.

The controller 31 in the first embodiment and the second embodiment determines whether the vehicle is in the towing state regardless of the driver's intention. However, in the present embodiment, a tow switch 39 operated by the driver is provided on the driver's seat of the vehicle as shown in FIG. 1. The controller 31 determines whether the vehicle is in the towing state based on the ON/OFF of the tow switch 39.

Therefore, the controller 31 according to this embodiment executes the towing state flag setting routine shown in FIG. 12 instead of the towing state flag setting routine shown in FIG. 11. The other constitutions are the same as those of the controller 31 according to the second embodiment.

In this embodiment, switching of the minimum engine rotation speed in the towing state and in the non-towing state is substantially left up to the driver. In other words, if the driver wants to obtain the necessary vehicle drive power when traveling uphill in the towing state, the driver switches the tow switch 39 from OFF to ON.

Referring to FIG. 12, the controller 31 determines whether the tow switch 39 is ON in a step S41. If the tow switch 39 is ON, the controller 31 determines that the vehicle is in the towing state, and sets the towing state flag to unity in the step S32. The towing state flag is initially set to zero when the internal combustion engine 1 is started or the vehicle starts driving as in the other embodiments. On the other hand, if the tow switch 39 is not ON in the step S41, the controller 31 determines that the vehicle is not in the towing state, and resets the towing state flag to zero in the step S33.

The controller 31 according to this embodiment executes the computation routine of the minimum engine rotation speed Nebest of FIG. 4 using the towing state flag set by executing the towing state flag setting routine of FIG. 12.

According to this embodiment, the minimum engine rotation speed can be switched according to the driver's desire.

Figure 14:
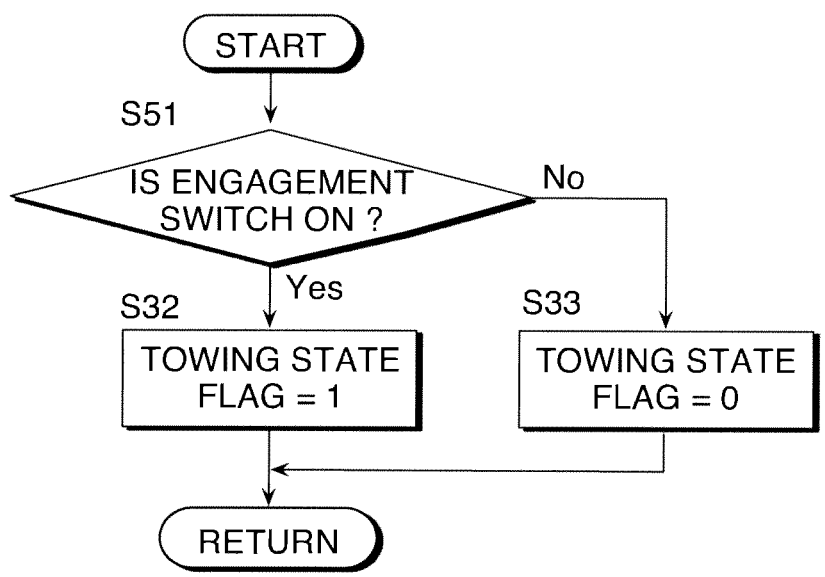
FIG. 14 is a flow chart explaining a towing state flag setting routine executed by a controller according to the fourth embodiment of this invention.

Referring to FIGS. 13 and 14, a fourth embodiment of this invention will be described.

Referring to FIG. 13, according to this embodiment, the vehicle 41 is coupled to a vehicle 42 to be towed by a pair of couplers 43 and 44. The couplers 43 and 44 can be engaged and disengaged in accordance with an operation by the driver.

In order to determine whether the pair of couplers 43 and 44 are engaged, the speed ratio control device according to this embodiment comprises a fastening switch 45 which turns ON in a state in which the pair of couplers 43 and 44 are engaged and turns OFF in a state in which the pair of couplers 43 and 44 are disengaged. A lamp that blinks when the pair of couplers 43 and 44 are engaged and turns off when they are disengaged according to a signal from the fastening switch 45 is provided on the driver's seat. The controller 31 determines whether the vehicle is in the towing state based on a signal from the fastening switch 45.

The controller 31 according to this embodiment executes the towing state flag setting routine shown in FIG. 14 instead of the towing state flag setting routine shown in FIG. 11 of the second embodiment. The other constitutions are the same as those of the controller 31 according to the second embodiment.

Referring to FIG. 14, the controller 31 determines if the fastening switch 45 is ON in a step S51. If the fastening switch 45 is ON, the controller 31 determines that the vehicle is in the towing state, and sets the towing state flag to unity in the step S32. The towing state flag is initially set to zero when the internal combustion engine 1 is started or the vehicle starts driving as in the other embodiments. On the other hand, if the fastening switch 45 is not ON in the step S51, the controller 31 determines that the vehicle is not in the towing state, and resets the towing state flag to zero in the step S33.

The controller 31 according to this embodiment executes the computation routine of the minimum engine rotation speed Nebest of FIG. 4 using the towing state flag set by executing the towing state flag setting routine of FIG. 14.

According to this embodiment, the engaged state and the disengaged state of the couplers 43 and 44 are reliably reflected in the switching of the minimum engine rotation speed.

The contents of Tokugan 2012-84020, with a filing date of Apr. 2, 2012 in Japan, are hereby incorporated by reference.

Although the invention has been described above with reference to certain embodiments, the invention is not limited to the embodiments described above. Modifications and variations of the embodiments described above will occur to those skilled in the art, within the scope of the claims.

INDUSTRIAL FIELD OF APPLICATION

As described above, according to the speed ratio control of this invention, the re-acceleration performance when the vehicle is traveling uphill while towing another vehicle can be improved. By applying this invention to vehicles which are often used to tow other vehicles, preferable effects can be anticipated with regard to maintaining the re-acceleration performance of the vehicle while suppressing noise.

The embodiments of this invention in which an exclusive property or privilege is claimed are defined as follows:

1. A speed ratio control device for a vehicle, the vehicle comprising an internal combustion engine and an automatic transmission connected to the internal combustion engine, the device comprising:
  a vehicle travel load detecting sensor that detects a travel load of the vehicle; and
  a programmable controller programmed to:
  determine if the travel load is equal to or greater than a predetermined value;
  set a minimum engine rotation speed to a first value when the travel load is not equal to or greater than the predetermined value;
  set the minimum engine rotation speed to a second value greater than the first value when the travel load is equal to or greater than the predetermined value;
  set a target speed ratio of the automatic transmission such that a rotation speed of the internal combustion engine becomes equal to or greater than the minimum engine rotation speed; and
  control a speed ratio of the automatic transmission to the target speed ratio.

2. The speed ratio control device according to claim 1, wherein the controller is further programmed to set the first value and the second value according to the travel load.

3. The speed ratio control device according to claim 1, wherein the vehicle travel load detecting sensor comprises an engine load sensor that detects a load of the internal combustion engine, a rotation speed sensor that detects a rotation speed of the internal combustion engine, and a vehicle speed sensor that detects a speed of the vehicle, and the controller is further programmed to:
  calculate a vehicle drive power from the load of the internal combustion engine and the rotation speed of the internal combustion engine;
  calculate an acceleration of the vehicle from the vehicle speed of the vehicle; and
  calculate the travel load from the drive power of the vehicle and the acceleration of the vehicle.

4. The speed ratio control device according to claim 1, wherein the Vehicle travel load detecting sensor comprises a road surface gradient detecting sensor that detects a gradient of a traveling road surface on which the vehicle is traveling, and the controller is further programmed to:
  compare the traveling road surface gradient with a predetermined road surface gradient threshold;
  determine that the travel load of the vehicle is greater than the predetermined value when the traveling road surface gradient is equal to or greater than the threshold.

5. The speed ratio control device according claim 1, wherein the vehicle comprises a vehicle cabin, and the vehicle travel load detecting sensor comprises a tow switch that is provided within the vehicle cabin and operated by a driver of the vehicle, and the controller is further programmed to determine that the travel load of the vehicle is greater than the predetermined value when the tow switch is ON.

6. The speed ratio control device according to claim 1, wherein the vehicle comprises a coupler that connects the vehicle to a towed vehicle to be towed by the vehicle, the vehicle travel load detecting sensor comprises a switch that turns ON when the coupler connects the towed vehicle and turns OFF when the coupler releases the towed vehicle, and the controller is further programmed to determine that the travel load of the vehicle is greater than the predetermined value when the switch is ON.

7. A speed ratio control device for a vehicle, the vehicle comprising an internal combustion engine and an automatic transmission connected to the internal combustion engine, the device comprising:
  means for detecting a travel load of the vehicle;
  means for determining if the travel load is equal to or greater than a predetermined value;
  means for setting a minimum engine rotation speed to a first value when the travel load is not equal to or greater than the predetermined value;
  means for setting the minimum engine rotation speed to a second value greater than the first value when the travel load is equal to or greater than the predetermined value;
  means for setting a target speed ratio of the automatic transmission that maintains a rotation speed of the internal combustion engine equal to or greater than the minimum engine rotation speed; and
  means for controlling a speed ratio of the automatic transmission to the target speed ratio.

8. A speed ratio control method for a vehicle, the vehicle comprising an internal combustion engine and an automatic transmission connected to the internal combustion engine, the method comprising:
  detecting a travel load of the vehicle;
  determining if the travel load is equal to or greater than a predetermined value;

setting a minimum engine rotation speed to a first value when the travel load is not equal to or greater than the predetermined value;
setting the minimum engine rotation speed to a second value greater than the first value when the travel load is equal to or greater than the predetermined value;
setting a target speed ratio of the automatic transmission that maintains a rotation speed of the internal combustion engine equal to or greater than the minimum engine rotation speed; and
controlling a speed ratio of the automatic transmission to the target speed ratio.

* * * * *